United States Patent
Mukker et al.

(10) Patent No.: US 8,533,707 B2
(45) Date of Patent: Sep. 10, 2013

(54) LINUX MATRIX COMPILATION SYSTEM AND METHOD

(75) Inventors: Atul Mukker, Suwanee, GA (US); Sreenivas Bagalkote, Suwanee, GA (US)

(73) Assignee: LSI Corporation, San Jose, CA (US)

( * ) Notice: Subject to any disclaimer, the term of this patent is extended or adjusted under 35 U.S.C. 154(b) by 967 days.

(21) Appl. No.: 12/074,508

(22) Filed: Mar. 4, 2008

(65) Prior Publication Data

US 2009/0228881 A1 Sep. 10, 2009

(51) Int. Cl.
G06F 9/445 (2006.01)

(52) U.S. Cl.
USPC .......................................................... 717/176

(58) Field of Classification Search
USPC .......................................................... 717/176
See application file for complete search history.

(56) References Cited

U.S. PATENT DOCUMENTS

| | | | |
|---|---|---|---|
| 6,178,503 B1 * | 1/2001 | Madden et al. | 713/2 |
| 6,449,050 B1 * | 9/2002 | Haikin | 358/1.1 |
| 6,615,303 B1 * | 9/2003 | Endo et al. | 710/260 |
| 6,711,605 B2 * | 3/2004 | Sekiguchi et al. | 718/100 |
| 7,356,679 B1 * | 4/2008 | Le et al. | 713/1 |
| 7,533,350 B2 * | 5/2009 | Vineyard et al. | 715/771 |
| 7,950,008 B2 * | 5/2011 | Bhide et al. | 717/174 |
| 7,971,201 B2 * | 6/2011 | Kasama | 717/170 |
| 2003/0145127 A1 * | 7/2003 | Unice | 709/321 |
| 2003/0154337 A1 * | 8/2003 | Ohno et al. | 710/260 |
| 2004/0153765 A1 * | 8/2004 | Prifling | 714/18 |
| 2007/0234000 A1 * | 10/2007 | Gujarathi et al. | 711/173 |
| 2007/0239861 A1 * | 10/2007 | Reeves et al. | 709/222 |

OTHER PUBLICATIONS

Lerhaupt et al., "Simplifying Linux Management with Dynamic Kernel Module Support".*
Domsch et al., "Dynamic Kernel Module Support: From Theory to Practice", Linux Symposium 2004 o Volume One.*
Gite "Linux Create User Account", Sep. 5, 2007, http://www.cyberciti.biz/faq/howto-add-new-linux-user-account/.*
Red Hat® Fedora™ Core 6 Unleashed• by: Andrew Hudson; Paul Hudson•Pub. Date: Dec. 15, 2006• Print ISBN-10: 0-672-32929-8.*
Kernel Korner—Exploring Dynamic Kernel Module Support (DKMS) Sep 1, 2003 by Gary Lerhaupt.*
Herbig, "Hpasm 7.1.0 and errata kernels", 2005.*
Domsch et al., "Dynamic Kernel Module Support: From Theory to Practice", Linux Symposium 2004.*
Gite, "Linux Create User Account", Sep. 5, 2007.*
Lerhaupt et al., "Simplifying Linux Management with Dynamic Kernel Module Support", 2004.*
"Simplifying Linux Management with Dynamic Kernel Module Support"; Lerhaupt et al., www.dell.com/powersolutions, Mar. 2004.*
Atul Mukker, et al., "Linux Matrix Compilation Environment," Power Solutions, Mar. 2004, Publisher: LSI Logic Corporation, pp. 94-98.

* cited by examiner

Primary Examiner — Don Wong
Assistant Examiner — Daxin Wu
(74) Attorney, Agent, or Firm — Suiter Swantz pc llo

(57) ABSTRACT

Methods and systems for device driver compilation dispensation of consumable compositions are provided.
A method for compiling device drivers may include, but is not limited to: (a) installing a host OS on a compiler server; (b) installing a plurality of target OS on the compile server; (c) installing a dynamic kernel module support package (DKMS) on the compile server for at least one of the plurality of target OS; (d) compiling a driver module on the compile server for a first target OS of the plurality of target OS; and (e) compiling a driver module on the compile server for a second target OS of the plurality of OS.

27 Claims, 7 Drawing Sheets

LINUX MATRIX COMPILATION SYSTEM AND METHOD

BACKGROUND

Linux-based Operating Systems (OS) are growing and evolving at a very rapid pace. Such development places a burden on device driver developers who must keep pace with the growth. In contrast to the application development, which mostly are compile-once and run everywhere scenarios, device drivers are closely tied to the architecture of the system on which they will run. At an even lower level, device drivers may be specific to a particular type of kernel. The existence of multiple Linux OS implementations only exacerbates such issues.

It is desirable to provide software-based redundant array of independent disk (RAID) control solutions that support multiple enterprise options from multiple Linux vendors (e.g. Red Hat and Novell) for both 32-bit and 64-bit architectures. Currently, these variables translate into approximately 50 distinct kernels that must be supported for each release of a device driver.

It is advisable to compile device drivers in the environment where they are targeted to run. As such, in order to build a driver to be released for all supported kernels, multiple installations of these kernels would be required. Multiple installations require either physically distinct installations of each supported OS. Driver binaries can then be built in the native environment and then collected together over network in a centralized repository.

However, this would conceivably require dozen or more servers in order to compile the device drivers. Secondly, this solution is not easily scaleable. In event of a new supported OS, a new server installation would be required. This quickly makes it a very cost ineffective and high-maintenance solution. The IT costs associated with maintaining and backup the servers is also very cost-inhibitive.

The requirement of multiple build servers may be circumvented by installing one server per kernel architecture and implementing multi-booting (e.g. booting more than one OS on a given server). While such a configuration would solve the issue of cost and maintenance of multiple servers, it would drastically slowdown the driver build process because of multiple boot cycles required and would not translate to an automated build process.

As such, it would be desirable to provide a device driver compilation environment contained on a limited number of servers while avoiding the use of multi-booting.

SUMMARY

The present disclosure is directed to a system and method for device driver development across multiple OS.

A method for administering a consumable composition may comprise: (a) installing a host OS on a compiler server; (b) installing a plurality of target OS on the compile server; (c) installing a dynamic kernel module support package (DKMS) on the compile server for at least one of the plurality of target OS; (d) compiling a driver module on the compile server for a first target OS of the plurality of target OS; and (e) compiling a driver module on the compile server for a second target OS of the plurality of OS.

A system for compiling device drivers may comprise: (a) means for installing a host OS on a compiler server; (b) means for installing a plurality of target OS on the compile server; (c) means for installing a dynamic kernel module support package (DKMS) on the compile server for at least one of the plurality of target OS; (d) means for compiling a driver module on the compile server for a first target OS of the plurality of target OS; and (e) means for compiling a driver module on the compile server for a second target OS of the plurality of OS.

It is to be understood that both the foregoing general description and the following detailed description are exemplary and explanatory only and are not necessarily restrictive of the claims. The accompanying drawings, which are incorporated in and constitute a part of the specification, illustrate examples and together with the general description, serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
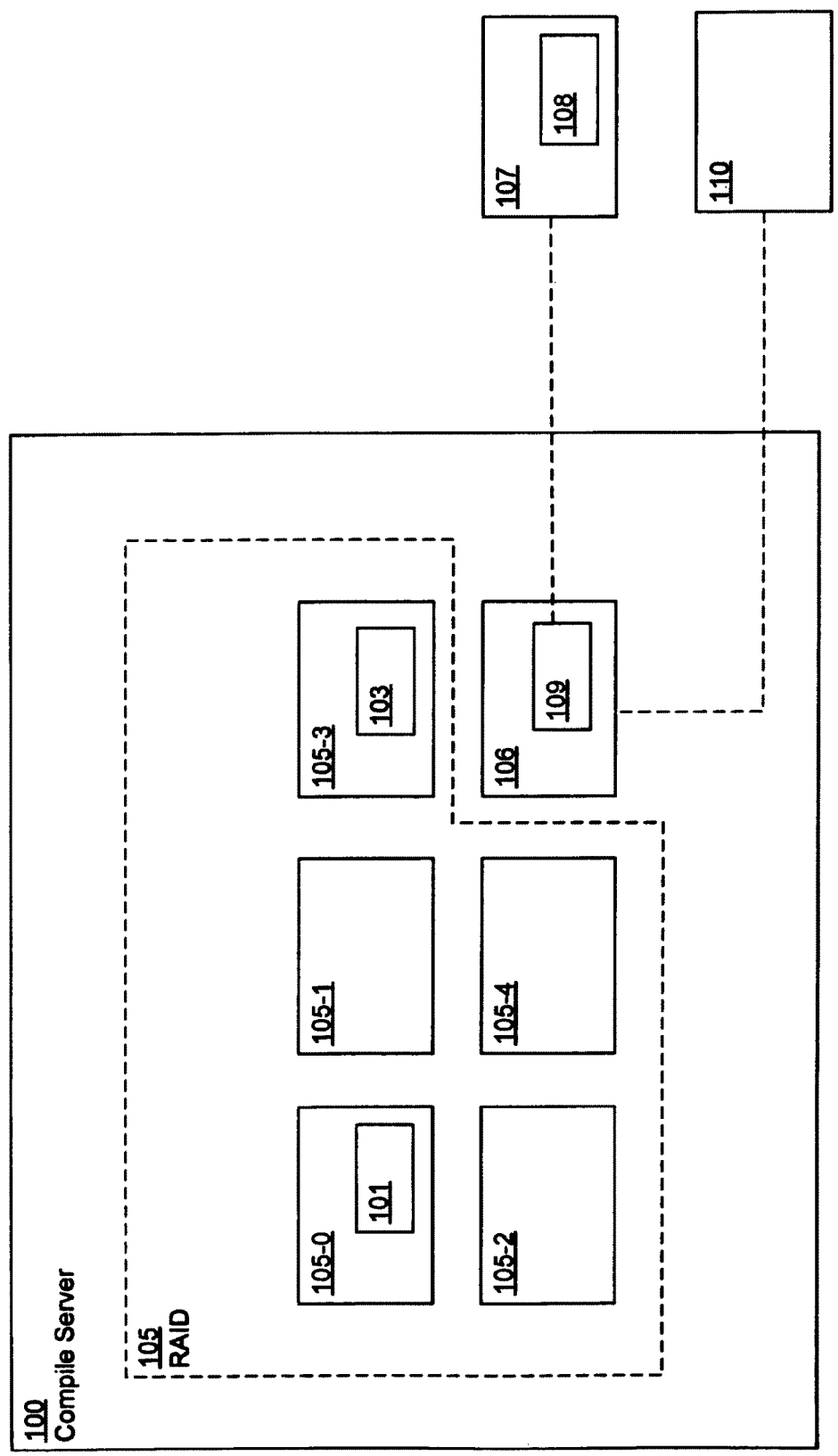
FIG. 1 shows a high-level block system for compilation of device drivers.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 illustrates an example system in which one or more technologies may be implemented. A compile server 100 may comprise a host OS 101 (e.g. Red Hat Advanced Server 3.0) which is chosen as a booting platform. The host OS 101 may be used for the limited purposes of booting the compile server 100.

The compile server 100 may be organized in such a manner so that a target OS 103 for which at least one driver may be compiled (e.g. Red Hat Professional, Red Hat Advanced Servers, SuSE Professional, SuSE Linux Enterprise Server (SLES), updates and kernels etc.) is housed in the compile server 100. Each of the target OS 103 may be provided with its native environment, including, but not limited to, compilers, shared libraries, configuration files and such.

In addition, the compile server 100 may switch between various target OS 103 without the need of rebooting. As such, two or more of the versions of Linux OS can be accessed simultaneously as will be discussed in further detail below.

The compile server 100 may support Secure Shell (SSH) protocols to allow for direct connectivity to the compile server 100 according to an internet protocol (IP) address. The compile server 100 may support File Transfer Protocol (FTP) to allow for Linux, Windows, or any other OS-based FTP clients to transfer files to and from the compile server 100. The compile server 100 may support a server message block (SMB)/common internet file system (CIFS) (e.g. Samba) implementing password-protected shared files ("shares"). Such shares 106 can be mounted on client machines (e.g. Windows client 110) as shared folders, as will be discussed in further detail below.

The compile server 100 may be setup as a 3-drive RAID-5 configuration. However, various other numbers of drives and RAID levels are fully contemplated. The RAID-5 array may be divided in 5 logical drives 105. Logical drives 105-0, 105-1 and 105-3 may be development logical drives for archiving installed target OS 103 distributions and may be separate from the compiling environment. A fourth logical drive may be formatted as a Linux swap partition 105-2 and used as such by an active OS. An active OS may include the host OS 101 or a target OS 103 installed on logical drives 105-0, 105-1 and 105-3. Among the three development logical drives, logical drives 105-0 and 105-3 may be stable drives. The third logical drive may be a scratch partition 105-1 used to install the environment required for a given target OS 103 distribution. After installing on the scratch partition 105-1, a newly installed OS may then be copied to the appropriate location on a logical drive, which may be a dedicated compiler server drive 105-4.

When booted in the compile server 100 environment, the device-mapping table may be as follows:

TABLE 1

Device Layout

| Filesystem | Size | Used | Avail | Use % | Mounted on |
|---|---|---|---|---|---|
| /dev/sda2 | 63 G | 8.8 G | 51 G | 15% | / |
| /dev/sda1 | 99M | 15M | 80M | 16% | /boot |
| /dev/sda5 | 32 G | 33M | 30 G | 1% | /home |
| /dev/sda3 | 20 G | 33M | 19 G | 1% | /home/dkms |

The /home and /home/dkms persistent partitions may be common between all Linux versions installed on the compile server 100. Under the /home partition, all user home directories are created. In addition to user home directories, this partition may also house a "linux" directory. This directory may contain files and packages common to multiple Linux OS installed on the compile server 100. For example, the Dynamic Kernel Module Support (DKMS) package may be available at location /home/linux/packages/dkms. The DKMS package is designed to create a framework where kernel dependant driver module source code can reside to facilitate construction of driver modules as kernels are upgraded. More information about the DKMS package is available at website: http://linux.dell.com/dkms/dkms.html and will be discussed in more detail below.

These partitions may be made available to an active OS by mounting a small computer system interface (SCSI) device /dev/sda5 or using a network file system (NFS).

For example, the /home/dkms directory may be used by the DKMS package to compile drivers and associated packages. This package may be mounted on a target OS 103 platform at /var/dkms. Again, this package can be mounted using SCSI device /dev/sda3 or as an NFS volume.

The logical drives layout may be as follows:

TABLE 2

Attached Logical Drives
Attached devices:

Host: scsi0 Channel: 00 Id: 00 Lun: 00
Vendor: MegaRAID Model: LD 4 RAID5 117G Rev: 196V
Type: Direct-Access              ANSI SCSI revision: 02
Host: scsi0 Channel: 00 Id: 01 Lun: 00
Vendor: MegaRAID Model: LD 0 RAID5 8G Rev: 196V
Type: Direct-Access              ANSI SCSI revision: 02
Host: scsi0 Channel: 00 Id: 02 Lun: 00
Vendor: MegaRAID Model: LD 1 RAID5 4G Rev: 196V
Type: Direct-Access              ANSI SCSI revision: 02
Host: scsi0 Channel: 00 Id: 03 Lun: 00
Vendor: MegaRAID Model: LD 2 RAID5 2G Rev: 196V
Type: Direct-Access              ANSI SCSI revision: 02
Host: scsi0 Channel: 00 Id: 04 Lun: 00
Vendor: MegaRAID Model: LD 3 RAID5 8G Rev: 196V
Type: Direct-Access              ANSI SCSI revision: 02

The above information can be obtained by reading the /proc file/proc/scsi/scsi.

Kernel And Linux Source Organization

The Linux and associated kernel sources for all supported platforms may be placed under a /cserver/<kernel-version> directory on the compile server. For example, the source code for Red Hat Advanced Server 3.0 is available under directory /cserver/2.4.21-4.EL. The complete filesystem of each version of Linux may be available underneath this directory structure.

The kernel source may be available at /cserver/<"kernel-version">/usr/src/linux-<"kernel-version">. For example, the kernel code for Advanced Server 3.0 may be visible at location /cserver/2.4.21-4.EUusr/src/linux-2.4.21-4.EL.

The compile server 100 may use configuration files for its operations. Such files may be for the internal operations of the compile server 100. Such configuration files may include ".cserver.inf." This configuration file may be located under the /cserver/<"kernel-version"> directory for a given kernel. This file may maintain information about the target OS 103 distribution from which the directory was populated. This file may be parsed to obtain the required information. The following is an exemplary excerpt from the configuration file for Red Hat Advanced Server 3.0. Of particular note are sections "DKMS_KERNELS" and "DKMS_RPM_BASE_KERNEL." The DKMS program may use DKMS_KERNELS to identify all kernels for which a given driver package is to be built for. DKMS_RPM_BASE_KERNEL may be used in the Red Hat Package Manager (RPM) specification file to identify the package, which has drivers for all related kernels.

TABLE 3

.INF file for compile server

\#
\#
\# DISTRIBUTION
\#   DIST_VENDOR          : Vendor of the kernel
\#   DIST_FAMILY           : Vendor identification string for family of kernel TABLE 3-continued .INF file for compile server

```
#   DIST_VERSION           : Release version of distribution shipping this kernel
#   DIST_CODENAME          : Code name assigned to this release

# Distribution which shipped this kernel

DIST_VENDOR="Red Hat"
DIST_FAMILY="Enterprise Linux AS"
DIST_VERSION="3"
DIST_CODENAME="(Taroon)"

# KERNEL_ARCH

# Architecture supported by this kernel

KERNEL_ARCH1="athlon"
KERNEL_ARCH2="athlon-smp"
KERNEL_ARCH3="i386"
KERNEL_ARCH4="i386-BOOT"
KERNEL_ARCH5="i586"
KERNEL_ARCH6="i586-smp"
KERNEL_ARCH7="i686"
KERNEL_ARCH8="i686-hugemem"
KERNEL_ARCH9="i686-smp"
KERNEL_ARCH10="ia64"
KERNEL_ARCH11="x86_64"
    KERNEL_ARCH12="x86_64-smp"
    #
    # DKMS_KERNELS
    #
    # The kernels used while building the driver package using DKMS program
    #
    DKMS_KERNELS="2.4.21-4.EL   2.4.21-4.ELBOOT   2.4.21-4.ELhugemem   2.4.21-
        4.ELsmp"
```

Complier Server Infrastructure

In the following examples, Red Hat Advanced Server 3.0 is referenced as a host OS 101. As such, the configuration is accomplished using Red Hat tools. However, various other OS and their accompanying configuration tools may be employed without departure from the scope of the present disclosures.

It may be necessary to create various user accounts before proceeding. Two users, "dkms" and "linux" may be created. User "dkms" may own the folder /home/dkms. This location may be used by the DKMS package while building driver modules. It should be noted that DKMS does not address this location directly. Instead, this device is first mounted on the /var/dkms location on a target OS 103. User "linux" may have home directory at /home/linux. This location may be used to store common packages that might be required for multiple target OS 103. To create these user accounts, tools such as "redhat-config-users" or "useradd" may be used.

Setting Up SMB/CIFS Shares

The compile server 100 may export the directory /home/linux /logicshare as a Samba partition 106. This partition may be mounted remotely from a client machine 107 implementing software configuration management (SCM) (e.g. "Clear-Case"). A compile server interface program 108 running on the client may access appropriate driver components 109 from a repository and store them at this location. The build process on the compile server may take the components from the partition /home/linux /logicshare to rebuild a driver.

Samba is a file and print server for Windows-based clients using TCP/IP as the underlying transport protocol. Samba can support any SMB/CIFS-enabled client. As such, it may be utilized by both Windows and Linux-based machines together without requiring a separate Windows NT/2000/2003 Server.

The compile server 100 may also export one of the partitions as a Samba share. As referenced above, the location of the Samba partition 106 on compile server 100 may be /home/dkms/logicshare. This Samba partition 106 can be mounted as a Samba share from a remote Windows client 110 by specifying an IP address via FTP (e.g. \\147.145.18.20\logicshare) or SSH (e.g. \norlinuxcserver\logicshare).

Figure 2:
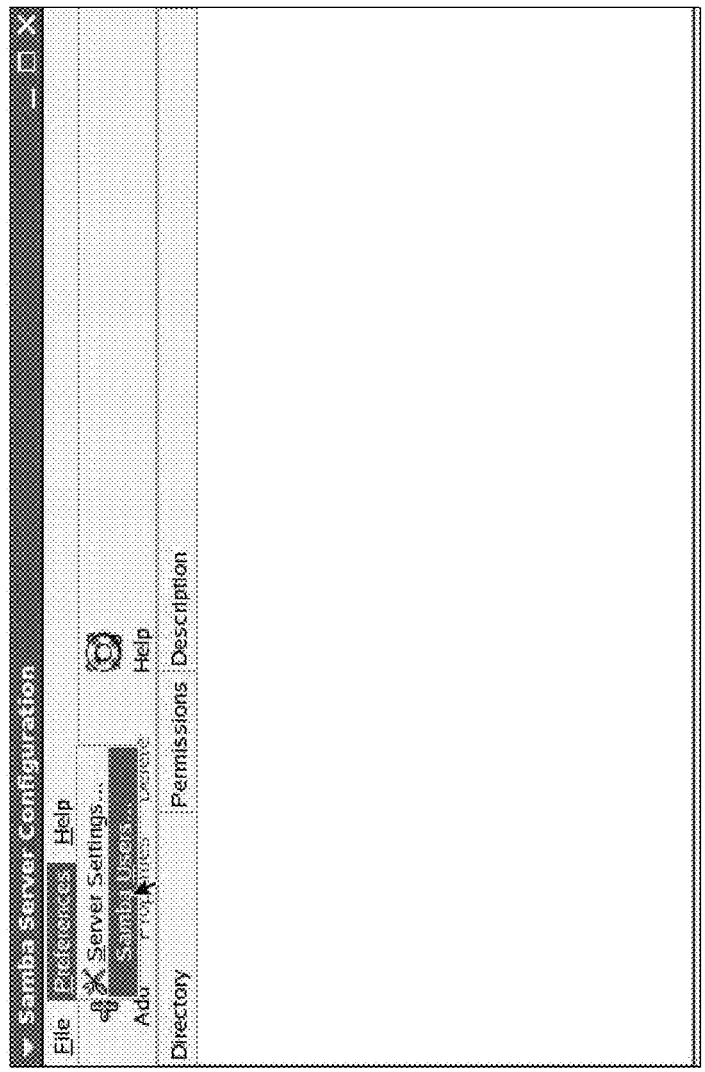
FIG. 2 shows an illustration of a interface for creation of a Samba share.

In an exemplary embodiment, to setup the Samba service on the compile server 100, a user may execute the command "redhat-config-Samba." Referring to FIG. 2, on the main Samba Server Configuration window, a user may select Preferences→Samba Users and activate the "Add User" button.

Figure 3:
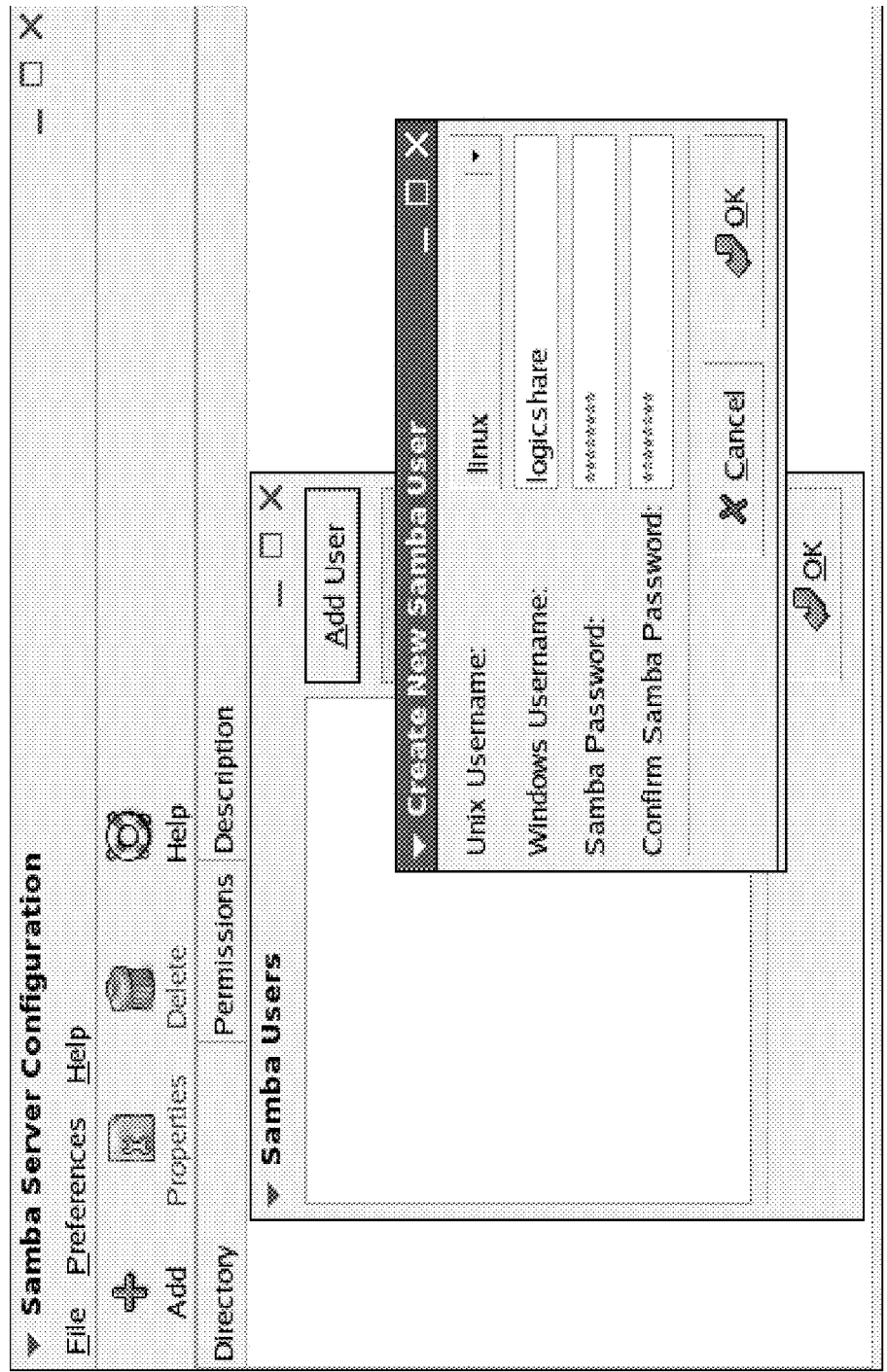
FIG. 3 shows an illustration of a interface for creation of a Samba share.

Referring to FIG. 3, a user may choose a Unix username (e.g. "linux") as well as a Windows access username (e.g., "logicshare") for sharing the folder with a Windows client 110. The Windows user name may be used to connect to the Samba partition 106 from the Windows client 110. An appropriate password may also be defined to regulate access to the share.

Figure 4:
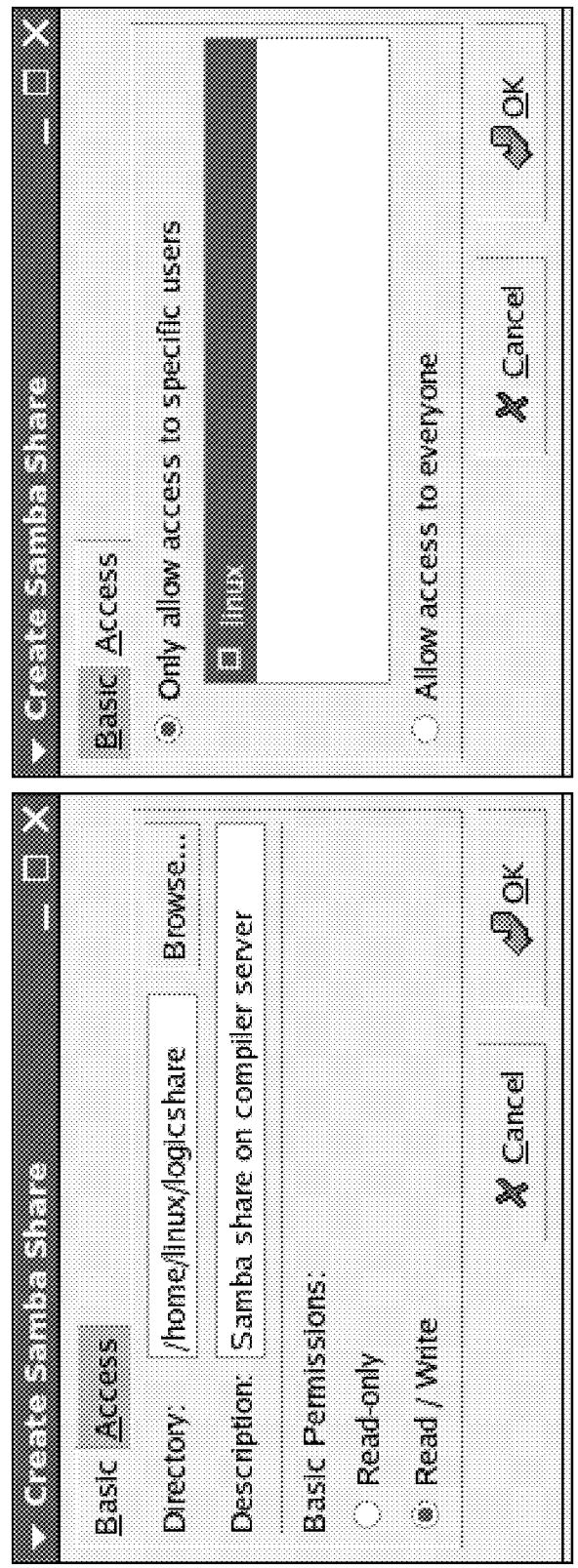
FIG. 4 shows an illustration of a interface for creation of a Samba share.

Referring to FIG. 4, a Samba share may be created by activating the "Add" button on the main menu. This will bring out the "Create Samba Share" dialog box. Under the access tab, a user may select "only allow access to specified users" followed by selecting a user (e.g. "linux"). A user may switch to the tab labeled "Basic" and activate the "Browse" button to select a directory to be shared, (e.g., /home/linux/logicshare). A brief description may be added and the "basic permissions" modified to Read/Write.

Figure 5:
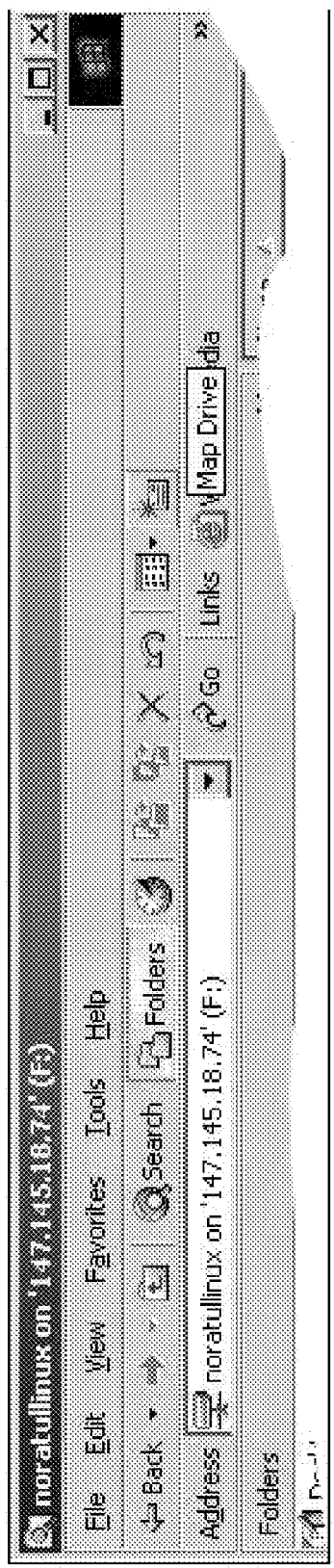
FIG. 5 shows an illustration of a interface for creation of a Samba share.
Figure 6:
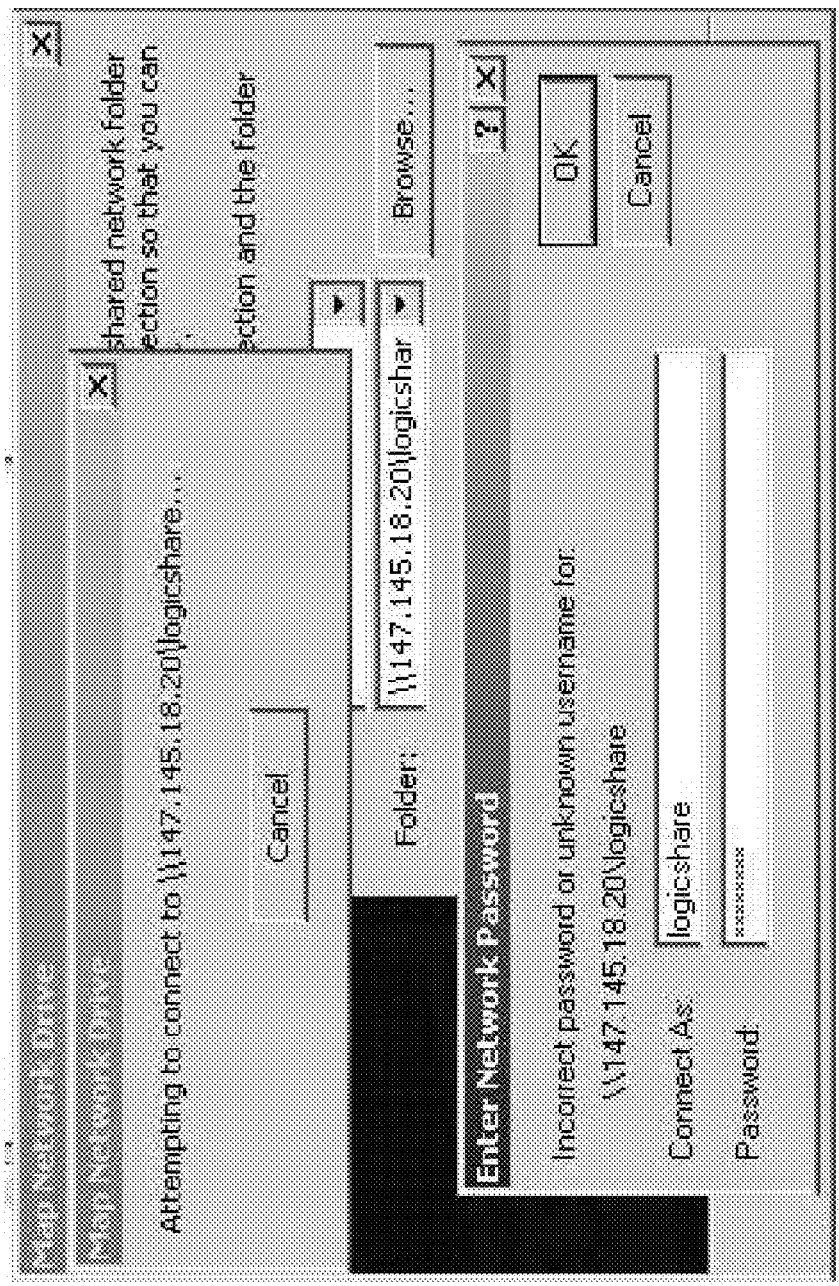
FIG. 6 shows an illustration of a interface for creation of a Samba share.

FIGS. 5 and 6 show an illustration of an interface for mounting a Samba share. In order to mount a share from a Windows client 110 may drive may be specified in the map network drive dialog box.

Driver Compilation Process

Figure 7:
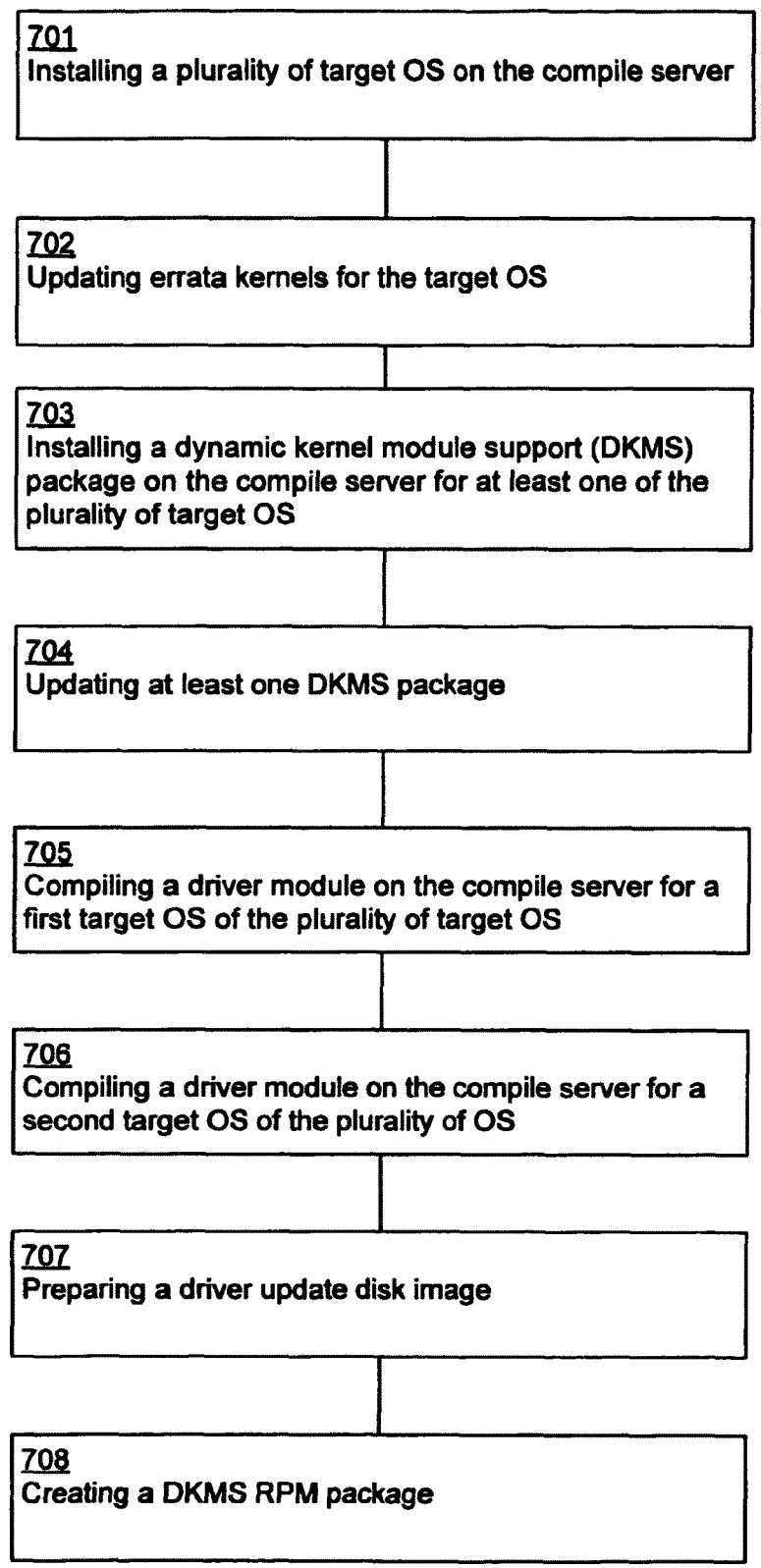
FIG. 7 shows a process for the compilation of device drivers.

Referring to FIG. 7, a process for compiling drivers for multiple target OS 103 is presented. It should be noted that the process may further include the base operations for creating the compilation environment as described above.

Adding New Linux Distributions And Kernels

At step 701, installing a plurality of target OS 103 on a compile server may occur. As an example, this discussion focuses on Red Hat Advanced Server 2.1 (kernel 2.4.9-e.3) as the target OS 103. However, it will be apparent that any target OS 103 may be installed in like manner.

Before beginning, it may be advisable to boot into the host OS 101 to confirm that the logical drive layout is correct (e.g. as shown in Table 2: Attached Logical Drives). In addition, the compile server device layout may be compared to the information as in Table 1: Device Layout.

In order to facilitate booting the target OS 103, the following entry may be added in the Grand Unified Bootloader (GRUB) configuration file, /boot/grub/menu.Ist:

```
title Target OS
    rootnoverify (hd2,0)
    chainloader +1
```

Note that the scratch partition 105-1 may be used to install the target OS 103. After the installation, this target OS 103 may be transferred to the host OS 101.

Using a boot CD-ROM, the target OS 103 installation of the new target OS 103 may be initiated. The scratch partition 105-1 may be used to install the new target OS 103. While installing the new target OS 103, the new partition table may be written to the first sector of the-scratch partition 105-1 instead of the Master Boot Record (MBR) of the boot disk. In addition, the development and kernel development packages may be selected for all of the target OS 103.

A scenario may occur where one might be required to boot the target OS 103 at least once (e.g. to add DKMS package, or to add the kernels which were not installed during normal install.) This step may also be done after booting the host OS and then switching to environment of target OS 103. As the Master Boot Record (MBR) is reserved for booting the host OS 101, the boot record of the target OS 103 may be written to the first sector of its root partitions, which is /dev/sdc1, See Table 1: Device Layout After the installation is complete, the compile server 100 may be rebooted to the newly installed target OS 103 using the "Target OS" menu item from the GRUB menu. Required packages that were not installed during normal install may be installed. For example, all the kernels for which the driver builds are anticipated may be installed. It should be noted that the BOOT kernel should also be installed, since it is required to prepare the driver update disks. Following is an exemplary sequence of Unix BASH input/output (I/O) for installing kernels

```
# mount /dev/cdrom /mnt/cdrom      # mount the cd with kernels
# cd /mnt/cdrom/RedHat/RPMS
# rpm -ivh kernel-enterprise-2.4.9-e.3.i686.rpm
# rpm -ivh kernel-BOOT-2.4.9-e.3.i686.rpm
# rpm -ivh kernel-<others, if not already installed>
# umount /mnt/cdrom
```

In addition, the DKMS package may be installed. The DKMS may be installed from the centralized location of (/dev/sda5)/home/linux/packages/dkms. Following is an exemplary sequence of Unix BASH I/O for installing a DKMS package:

```
# mount /dev/sda5 /home
# cd /home/linux/packages/dkms
# rpm -ivh DKMS-1.02-1.noarch.rpm
# cd /
# umount /home
```

After installing the appropriate packages, the server may be rebooted to the host OS 101. It should be noted that each of the target OS 103 may share the same driver source code. This driver source code may reside on the host OS 101. When a device driver is to be complied for a target OS 103, the host OS 101 may be made available to the target using an NFS mount. As such, a target OS 103 may be created for the host OS 101.

Switching Between Distributions

After the installation of a target OS 103 is complete, the compile server 100 may be booted to the host OS 101. To enable a target OS 103 on the host OS 101, a proper environment on host OS 101 may be established for the target OS 103. To do this, an entry for the target OS 103 may be created under the /cserver directory of the host OS 101. Following is an exemplary sequence of Unix BASH I/O for creation of a /cserver directory:

mkdir/cserver/2.4.9-e.3

The device on which the target OS 103 was installed may be mounted and all the files copied to the target OS 103 root location. After this is done, a ".cserver.inf" file may be created in the target OS 103 home directory. For this, an already existing file may be used and adapted for a target OS 103.

```
# mount /dev/sdc1 /mnt
# cp -r /mnt/* /cserver/2.4.9-e.3
# cp /cserver/2.4.21-4.EL/.cserver.inf .
```

The ".cserver.inf" file, as described above, may then be edited to incorporate appropriate changes. To switch to a target OS 103, a "change root" command may be used to redirect to the home directory of the target OS 103.

chroot/cserver/2.4.9-e.3

It should be noted that the "chroot" command will switch the filesystem root pointer only. Non-transient activities, e.g., /proc filesystem, kernel, kernel modules, shared memory, etc. are still in context of the host OS 101. Any operation under a target OS 103 which relies on such resources may fail. For example, no matter which of the target OS 103 is enabled, the command 'uname-r' would always come back with 2.4.21-4.EL, when using Advanced Server 3.0 as the host OS 101.

Updating Errata Kernels

At step 702, updating errata kernels may occur. Updating an existing target OS 103 with errata kernel packages may not require installation as a new target OS 103. For the compile server environment, installation of only the errata kernels upgrade may suffice in most circumstances. If the install is a kernel upgrade for an existing release, updating the existing target OS 103 with the new kernel may be sufficient. The following steps may be used to upgrade the exiting target OS 103:

```
# chroot /cserver/2.4.9-e.3
# cd tmp
# <get the required 2.4.9-e.34 kernels>
# ls
kernel-2.4.9-e.34.i686.rpm
kernel-BOOT-2.4.9-e.34.i386.rpm
kernel-enterprise-2.4.9-e.34.i686.rpm
kernel-smp-2.4.9-e.34.i686.rpm
kernel-source-2.4.9-e.34.i386.rpm
# for i in kernel*; do
> rpm -ivh $i
> done
# cd /cserver
# ln -s 2.4.9-e.3 2.4.9-e.34
```

However, if there are many changes for a particular errata release, e.g., a new compiler suite, major changes in the kernel SCSI code, installation as a new target OS 103 as described above may be advisable.

After upgrading the target OS 103 with the errata kernel, the .cserver.inf file may be modified. As the target OS 103 and the errata update may share a root location, the .cserver.inf file may contain information about both installations. Specifically, the errata kernel entries may be added to the "DKMS_KERNELS" section of this .cserver.inf. In addition, a soft link may be created in the compile server root, pointing from the errata kernel to the target OS 103.

Dynamic Kernel Module Support (DKMS) Components

At step 703, installing a DKMS package for every target OS 103 on the compile server 100 (e.g. the host OS 101 and/or target OS 103) may occur.

As presented above, the DKMS may be installed from the centralized location of (/dev/sda5)/home/linux/packages/dkms after installing the target OS 103 on the scratch partition 105-1 and booting into it or by booting the compile server 100 from the host OS 101 and creating the environment in the compile server 100 for the newly installed target OS 103.

Upgrading to New DKMS Package

Descriptions have been previously provided regarding how to boot to the target OS 103 and add missing packages. However, there may be situations where existing packages must be revised or replaced.

At step 704, updating the DKMS packages may occur. As the target OS 103 might no longer available on the scratch partition 105-1, a mechanism may be required to upgrade packages on a target OS 103 in the host OS 101 environment. In the following example, the version of the existing DKMS package currently installed for each target OS 103 may be determined and, if necessary, upgraded a newer version. In addition, DKMS on the host OS 101 may also be upgraded as it is used to create the initial DKMS environment, driver update disks etc. Tools are available in the /home/linux/bin directory to automate this process. For upgrading the host OS 101 DKMS, the driver specific files from /var/dkms directory may be saved:

```
[root@dhcp-34-19 root]# for target in /cserver/*; do
> if [ ! -h $target ]; then      # if not a soft link
> chroot $target bash -c "echo -n \"$target : \"; \
> rpm -qa | grep DKMS"
> fi
> done
```

To upgrade to a newer version (e.g. from 1.02 to 1.05), the existing version may first be removed:

```
[root@dhcp-34-19 root]# for target in /cserver/*; do
> if [ ! -h $target ]; then      # if not a soft link
> chroot $target bash -c "rpm -ev DKMS-1.02-1"
> fi
> done
```

Upgrading to a new version available in /home/linux/dkms/packages/dkms directory:

```
[root@dhcp-34-19 root]# for target in /cserver/*; do
> if [ ! -h $target ]; then      # if not a soft link
> chroot $target bash -c "mount /dev/sda5 /home;
> rpm -ivh /home/linux/packages/dkms/dkms-1.05-1.noarch.rpm;
> umount /home"
> fi
> done
[root@dhcp-34-19 root]# rm -rf /home/dkms/* /home/dkms.*
[root@dhcp-34-19 root]# cd /home/dkms
[root@dhcp-34-19 DKMS]# (cd /cserver/2.4.21-4.EL/var/dkms; tar cvf -
.) | tar xvf -
```

The first command upgrades the DKMS package for all target OS 103, including the target image of the host OS 101. The following command removes the older files from the DKMS home directory. Finally, the DKMS home directory is populated using one of the target OS 103 images.

Building Driver Packages Using DKMS

At step 705, compiling a driver module on the compile server for a first target OS of the plurality of target OS. The DKMS program may be used to build the driver modules and the Driver Update Disks. It is assumed that the host OS 101 and target OS 103 have been established and the appropriate DKMS package has been installed for the host OS 101 and all target OS 103. In the following example, the module being utilized is "megaraid2" and the version is "v2.10.2". The following describes building the megaraid2 module for the following kernels:

```
[root@dhcp-34-19 root]# ls -l /cserver
total
16
drwxr-xr-x  19 root   root   4096 Mar 15 18:00 2.4.18-14
lrwxrwxrwx   1 root   root      8 Mar  5 02:00 2.4.20-16.9 -> 2.4.20-8
drwxr-xr-x  19 root   root   4096 Mar 15 18:00 2.4.20-8
lrwxrwxrwx   1 root   root      8 Mar  5 02:00 2.4.20-9 -> 2.4.20-8
drwxr-xr-x  19 root   root   4096 Mar 15 18:00 2.4.21-4.EL
drwxr-xr-x  18 root   root   4096 Mar 15 18:00 2.4.9-e.3
lrwxrwxrwx   1 root   root      9 Mar 15 00:59 2.4.9-e.34 -> 2.4.9-e.3
```

The following is an exemplary Unix BASH input/output (I/O) sequence for creation of a driver module:

```
[root@dhcp-34-19 root]# chroot /cserver/2.4.18-14
[root@dhcp-34-19 root]# mount /dev/sda5 /home
[root@dhcp-34-19 root]# mount /dev/sda3 /var/dkms
```

-continued

```
[root@dhcp-34-19 root]# cd /usr/src
[root@dhcp-34-19 src]# ln -s /home/linux/source/megaraid2-v2.10.2
[root@dhcp-34-19 root]# cd /
[root@dhcp-34-19 /]# for kernel in 2.4.18-14BOOT 2.4.18-14 2.4.18-
    14smp 2.4.18-14bigmem; do
> DKMS build -m megaraid2 -v v2.10.2 -k $kernel
> done
Preparing kernel 2.4.18-14BOOT for module build:
(This is not compiling a kernel, only just preparing kernel symbols)
Storing current .config to be restored when complete
Running Generic preparation routine
make mrproper....
using        /lib/modules/2.4.18-14BOOT/build/configs/kernel-2.4.18-i386-
    BOOT.config
make oldconfig...
make dep.............
Building module:
applying patch rhl80.patch...patching file megaraid2.c
patching file megaraid2.h
cleaning build area....
make    KERNELRELEASE=2.4.18-14BOOT   -C   /lib/modules/2.4.18-
    14BOOT/build SUBDIRS=/var
/dkms/megaraid2/v2.10.2/build modules...
cleaning build area....
cleaning kernel tree (make mrproper)....
DKMS: Build Completed.
[root@dhcp-34-19 /]# DKMS status
megaraid2, v2.10.2, 2.4.18-14: built
megaraid2, v2.10.2, 2.4.18-14bigmem: built
megaraid2, v2.10.2, 2.4.18-14BOOT: built
megaraid2, v2.10.2, 2.4.18-14smp: built
[root@dhcp-34-19 /]# DKMS mktarball -m megaraid2 -v v2.10.2 -
    binaries-only -k 2.4.18-14BOOT,2.4.18-14,2.4.18-14smp,2.4.18-
    14bigmem
Marking /usr/src/megaraid2-v2.10.2 for archiving...
Marking kernel 2.4.18-14 for archiving...
Marking kernel 2.4.18-14bigmem for archiving...
Marking kernel 2.4.18-14BOOT for archiving...
Marking kernel 2.4.18-14smp for archiving...
Tarball location: /var/dkms/megaraid2/v2.10.2/tarball/megaraid2-v2.10.2-
    kernel2.4.18-14-kernel2.4.18-14bigmem-kernel2.4.18-14BOOT-
    kernel2.4.18-14smp.dkms.tar.gz
Done.
[root@dhcp-34-19 /]# cd /var/dkms/megaraid2/v2.10.2/tarball
[root@dhcp-34-19 tarball]# mV megaraid2-v2.10.2-kernel2.4.18-14-
    kernel2.4.18-14bigmem-kernel2.4.18-14BOOT-kernel2.4.18-
    14smp.dkms.tar.gz /usr/src/megaraid2-v2.10.2/ megaraid2-
    v2.10.2-kernel2.4.18-14-all.tgz
[root@dhcp-34-19 tarball]# umount /home
[root@dhcp-34-19 tarball]# umount /var/dkms
[root@dhcp-34-19 tarball]# exit
```

The DKMS partition may be populated with the driver. A single partition, /dev/sda3, for the DKMS build area may be shared between all target OS 103 and the host OS 101. Before the driver is added to the DKMS repository, a directory called "megaradi2-v2.10.2" may be created. This directory may contain the driver source code, makefile, DKMS configuration file DKMS.conf, patches directory, driver update disk components directory, etc. As a convention, the directory "megaraid2-v2.10.2" may be created under /home/linux/source directory. It may then be references using soft links.

```
[root@dhcp-34-19 root]# ls -l /home/linux/source/megaraid2-v2.10.2/
total 224
-rw-r--r-- 1 220      AUTHORS
-rw-r--r-- 1 7192     ChangeLog
-rw-r--r-- 1 17992    COPYING
-rw-r--r-- 1 855      dkms.conf
-rw-r--r-- 1 133      Makefile
-rw-r--r-- 1 129248   megaraid2.c
-rw-r--r-- 1 6263     megaraid2.dkms.spec
-rw-r--r-- 1 33386    megaraid2.h
```

-continued

```
drwxr-xr-x  2 4096    patches
drwxr-xr-x  2 4096    redhat_driver_disk
```

The following is an exemplary Unix BASH input/output (I/O) sequence for creation of the driver source directory link and addition of a driver module to the DKMS repository:

```
[root@dhcp-34-19 root]# cd /usr/src
[root@dhcp-34-19 root]# ln -s /home/linux/source/megaraid-v2.10.2
[root@dhcp-34-19 root]# mount /dev/sda3 /var/dkms
[root@dhcp-34-19  root]# DKMS add  -m megaraid2  -v v2.10.2 --
    rpm_safe_upgrade
Creating    symlink    /var/dkms/megaraid2/v2.10.2/source-
    >/usr/src/megaraid2-v2.10.2
DKMS: Add Completed.
[root@dhcp-34-19 src]# DKMS status
megaraid2, v2.10.2: added
[root@dhcp-34-19 src]# umount /var/dkms
```

The module "add" operation of DKMS may only be done once for each driver as the 'add' operation may be leveraged for all other target OS 103 previously described.

At step 706, compiling a driver module on the compile server for a second target OS of the plurality of OS may occur. The above steps may be repeated to compile drivers for the kernels of all other target OS 103 based on the existing driver constructed above:

```
[root@dhcp-34-19 root]# chroot /cserver/2.4.20-8
[root@dhcp-34-19 root]# mount /dev/sda5 /home
[root@dhcp-34-19 root]# mount /dev/sda3 /var/dkms
[root@dhcp-34-19 root]# cd /usr/src
[root@dhcp-34-19 src]# ln -s /home/linux/source/megaraid2-v2.10.2
[root@dhcp-34-19 root]# cd /
[root@dhcp-34-19 /]# for kernel in 2.4.20-16.9bigmem 2.4.20-16.9smp
    2.4.20-16.9 2.4.20-8bigmem 2.4.20-8smp 2.4.20-8BOOT 2.4.20-8
    2.4.20-9bigmem 2.4.20-9smp 2.4.20-9BOOT 2.4.20-9; do
> DKMS build -m megaraid2 -v v2.10.2 -k $kernel
> done
[root@dhcp-34-19 /]# DKMS status
megaraid2, v2.10.2, 2.4.18-14: built
megaraid2, v2.10.2, 2.4.18-14bigmem: built
megaraid2, v2.10.2, 2.4.18-14BOOT: built
megaraid2, v2.10.2, 2.4.18-14smp: built
megaraid2, v2.10.2, 2.4.20-16.9: built
megaraid2, v2.10.2, 2.4.20-16.9bigmem: built
megaraid2, v2.10.2, 2.4.20-16.9smp: built
megaraid2, v2.10.2, 2.4.20-8: built
megaraid2, v2.10.2, 2.4.20-8bigmem: built
megaraid2, v2.10.2, 2.4.20-8BOOT: built
megaraid2, v2.10.2, 2.4.20-8smp: built
megaraid2, v2.10.2, 2.4.20-9: built
rnegaraid2, v2.10.2, 2.4.20-9bigmem: built
megaraid2, v2.10.2, 2.4.20-9BOOT: built
megaraid2, v2.10.2, 2.4.20-9smp: built
[root@dhcp-34-19 /]# DKMS mktarball -m megaraid2 -v v2.10.2 -
    binaries-only  -k   2.4.20-16.9bigmem,2.4.20-16.9smp,2.4.20-
    16.9,2.4.20-8bigmem,2.4.20-8smp,2.4.20-8BOOT,2.4.20-8,2.4.20-
    9bigmem,2.4.20-9smp,2.4.20-9BOOT,2.4.20-9
[root@dhcp-34-19 /]# cd /var/dkms/megaraid2/v2.10.2/tarball
[root@dhcp-34-19   tarball]#   mv    megaraid2-v2.10.2-
    manykernels.dkms.tar.gz         /usr/src/megaraid2-v2.10.2/
    megaraid2-v2.10.2-kernel2.4.20-all.tgz
[root@dhcp-34-19 tarball]# umount /home
[root@dhcp-34-19 tarball]# umount /var/dkms
[root@dhcp-34-19 tarball]# exit
```

At step 707, preparing a driver update disk image may occur. The driver update disk image may be prepared after the driver is compiled for all the kernels. This image may later be made part of the source RPM:

```
[root@dhcp-34-19 root]# DKMS mkdriverdisk -m megaraid2 -v
    v2.10.1 -k 2.4.21-4.ELBOOT,2.4.21-4.EL,2.4.21-4.Elsmp,2.4.21-
    4.Elhugemem
```

The update disk image may be compressed and copied to the source directory.

At step 708, creating a DKMS RPM package may occur. For the RPM source, all files in the /usr/src/megaraid2-v2.10.2 directory may be archived (e.g. as a tarball). The DKMS RPM may be made part of the package itself until it is adopted completely by users.

```
[root@dhcp-34-19 root]# ls -l /home/linux/source/megaraid2-v2.10.2/
-rw-r--r--    220        AUTHORS
-rw-r--r--    7192       ChangeLog
-rw-r--r--    17992      COPYING
-rw-r--r--    855        dkms.conf
-rw-r--r--    133        Makefile
-rw-r--r--    129248     megaraid2.c
-rw-r--r--    6371       megaraid2.dkms.spec
-rw-r--r--    33386      megaraid2.h
-rw-r--r--    428230     megaraid2-v2.10.1-dd.img.gz
-rw-r--r--    187906     megaraid2-v2.10.2-kernel2.4.18-14
                         all.tgz
-rw-r--r--    618569     megaraid2-v2.10.2-kernel2.4.20-all.tgz
-rw-r--r--    1002136    megaraid2-v2.10.2-kernel2.4.21-4.EL-
                         all.tgz
-rw-r--r--    2130561    megaraid2-v2.10.2-kernel2.4.9-e-all.tgz
-rw-r--r--    51570      dkms-1.05-1-noarch.rpm
drwxr-xr-x    4096       patches
drwxr-xr-x    4096       redhat_driver_disk
[root@dhcp-34-19    root]#  tar   czvf   megaraid2-v2.10.2-src.tgz
    AUTHORS   ChangeLog   COPYING   DKMS.conf   Makefile
    megaraid2.c   megaraid2.dkms.spec   megaraid2.h   patches
    redhat_driver_disk        megaraid2-v2.10.2-kernel2.4.20-all.tgz
    megaraid2-v2.10.2-kernel2.4.21-4. El-all.tgz megaraid2-v2.10.10-
    kernel2.4.9-e-all.tgz
[root@dhcp-34-19 root]# cp  megaraid2-v2.10.2-src.tgz  megaraid2-
    v2.10.2-kernel2.4.18-14-all.tgz  megaraid2-v2.10.2-kernel2.4.21-
    4.EL-all.tgz         megaraid2-v2.10.2-kernel2.4.9-e-all.tgz/
    usr/src/redhat/SOURCES
```

Edit the megaraid2.dkms.spec to make the rpm. For more information on how to write the RPM spec file for DKMS, refer to the DKMS documentation. Finally, execute the following command to create the RPM packages:

[root@dhcp-34-19 root]#rpmbuild-ba megaraid2.dkms.spec

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cables a waveguide, a wired communications link, a wireless communication link (e.g., transmitter, receiver, transmission logic, reception logic, etc.), etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

What is claimed is:

1. A method for compiling device drivers for a plurality of target operating systems (OS), the method comprising:
   installing a host OS on a compiler server;
   installing a plurality of target OS on the compile server;
   installing a dynamic kernel module support package (DKMS) on the compile server for at least one of the plurality of target OS;
   compiling a driver module on the compile server for a first target OS of the plurality of target OS;
   compiling a driver module on the compile server for a second target OS of the plurality of OS based on the driver module for the first target OS.

2. The method of claim 1, wherein installing a plurality of target OS on the compile server further comprises:
   installing at least one kernel.

3. The method of claim 1, wherein installing a plurality of target OS on the compile server further comprises:
   updating at least one errata kernel.

4. The method of claim 1, wherein installing a dynamic kernel module support package (DKMS) on the compile server for at least one of the plurality of target OS further comprises:
   updating at least one DKMS package.

5. The method of claim 1, wherein installing a host OS on a compiler server further comprises:
   creating at least one user account.

6. The method of claim 1, wherein compiling a driver module on the compile server for a first target OS of the plurality of target OS further comprises:
   populating a DKMS partition with the driver.

7. The method of claim 1, wherein compiling a driver module on the compile server for a first target OS of the plurality of target OS further comprises:
   creating a driver source directory link.

8. The method of claim 1, wherein compiling a driver module on the compile server for a first target OS of the plurality of target OS further comprises:
   adding the driver module to a DKMS repository.

9. The method of claim 1, further comprising:
   constructing a DKMS Red Hat Package Manager (RPM) package.

10. The method of claim 1, further comprising:
    transmitting server message blocks (SMB) between the compile server and a client.

11. The method of claim 10, further comprising:
    creating a Samba share.

12. The method of claim 1, further comprising:
    switching between the first target OS and the second target OS.

13. The method of claim 1, further comprising:
    preparing a driver update disk image including the driver module for the first target OS and the driver module for the second target OS.

14. A non-transitory computer readable medium comprising computer readable instructions which, when executed on a processor, cause a computing device to execute a process, the process comprising:
    installing a host OS on a compiler server;
    installing a plurality of target OS on the compile server;
    installing a dynamic kernel module support package (DKMS) on the compile server for at least one of the plurality of target OS;
    compiling a driver module on the compile server for a first target OS of the plurality of target OS;
    compiling a driver module on the compile server for a second target OS of the plurality of OS; and
    preparing a driver update disk image including the driver module for the first target OS and the driver module for the second target OS.

15. The computer readable medium of claim 14, wherein installing a plurality of target OS on the compile server further comprises:
    installing at least one kernel.

16. The computer readable medium of claim 14, wherein installing a plurality of target OS on the compile server further comprises:
    updating at least one errata kernel.

17. The computer readable medium of claim 14, wherein installing a dynamic kernel module support package (DKMS) on the compile server for at least one of the plurality of target OS further comprises:
    updating at least one DKMS package.

18. The computer readable medium of claim 14, wherein installing a host OS on a compiler server further comprises:
    creating at least one user account.

19. The computer readable medium of claim 14, wherein compiling a driver module on the compile server for a first target OS of the plurality of target OS further comprises:
populating a DKMS partition with the driver.

20. The computer readable medium of claim 14, wherein compiling a driver module on the compile server for a first target OS of the plurality of target OS further comprises:
creating a driver source directory link.

21. The computer readable medium of claim 14, wherein compiling a driver module on the compile server for a first target OS of the plurality of target OS further comprises:
adding the driver module to a DKMS repository.

22. The computer readable medium of claim 14, further comprising:
constructing a DKMS Red Hat Package Manager (RPM) package.

23. The computer readable medium of claim 14, further comprising:
transmitting server message blocks (SMB) between the compile server and a client.

24. The computer readable medium of claim 23, further comprising:
creating a Samba share.

25. The computer readable medium of claim 14, further comprising:
switching between the first target OS and the second target OS.

26. A system for compiling device drivers, the system comprising:
means for installing a host OS on a compiler server;
means for installing a plurality of target OS on the compile server;
means for installing a dynamic kernel module support package (DKMS) on the compile server for at least one of the plurality of target OS;
means for compiling a driver module on the compile server for a first target OS of the plurality of target OS;
means for compiling a driver module on the compile server for a second target OS of the plurality of OS based on the driver module for the first target OS.

27. A system for compiling device drivers, the system comprising:
circuitry for installing a host OS on a compiler server;
circuitry for installing a plurality of target OS on the compile server;
circuitry for installing a dynamic kernel module support package (DKMS) on the compile server for at least one of the plurality of target OS;
circuitry for compiling a driver module on the compile server for a first target OS of the plurality of target OS;
circuitry for compiling a driver module on the compile server for a second target OS of the plurality of OS; and
preparing a driver update disk image including the driver module for the first target OS and the driver module for the second target OS.

* * * * *